United States Patent
Kobayashi et al.

(10) Patent No.: US 6,780,269 B2
(45) Date of Patent: Aug. 24, 2004

(54) METHOD FOR PREPARING LAMINATE FOR PACKAGING MATERIAL AND LAMINATE FOR PACKAGING MATERIAL

(75) Inventors: Norio Kobayashi, Tokyo (JP); Peter Frisk, Tokyo (JP)

(73) Assignee: Tetra Laval Holdings & Finance S.A., Pully (CH)

( * ) Notice: Subject to any disclaimer, the term of this patent is extended or adjusted under 35 U.S.C. 154(b) by 103 days.

(21) Appl. No.: 09/913,959

(22) PCT Filed: Dec. 20, 2000

(86) PCT No.: PCT/JP00/09029

§ 371 (c)(1),
(2), (4) Date: Dec. 17, 2001

(87) PCT Pub. No.: WO01/45931

PCT Pub. Date: Jun. 28, 2001

(65) Prior Publication Data

US 2002/0127419 A1 Sep. 12, 2002

(30) Foreign Application Priority Data

Dec. 22, 1999 (JP) ............................................. 11-365156
Dec. 22, 1999 (JP) ............................................. 11-365167
Dec. 22, 1999 (JP) ............................................. 11-365174

(51) Int. Cl.$^7$ ......................... B32B 15/08; B32B 23/08; B65H 81/00
(52) U.S. Cl. ...................... 156/192; 156/184; 156/191; 428/457; 428/461; 428/513
(58) Field of Search ................................. 156/184, 191, 156/192; 428/457, 461, 513

(56) References Cited

U.S. PATENT DOCUMENTS 3,941,643 A    3/1976  Balia ........................... 156/380
4,004,727 A    1/1977  Rausing et al. ............... 229/4.5
4,133,710 A    1/1979  Wartenberg ............. 156/244.27
4,424,260 A    1/1984  Pupp ........................... 428/461
4,460,425 A    7/1984  Rausér et al. .......... 156/244.23
4,495,016 A    1/1985  Viberg et al. ................ 156/152
4,657,614 A    4/1987  Andersson ............. 156/244.11
5,122,410 A    6/1992  Löfgren et al. ............. 428/216
6,458,469 B1 * 10/2002  DeLisio et al. ............. 418/516

FOREIGN PATENT DOCUMENTS

EP    0 945 252 A2   9/1999
JP    10-166530      6/1998
JP    10-202781      8/1998

* cited by examiner

Primary Examiner—Monique R. Jackson
(74) Attorney, Agent, or Firm—Burns, Doane, Swecker & Mathis, LLP

(57) ABSTRACT

A packaging material laminate comprises at least a printing ink outer layer, an aluminium vapor deposition film layer containing linear low density polyethylene obtained by a polymerization using metallocene catalyst, a polyethylene-extrusion lamination layer, and a carrier layer of paper or paper substitution material. The method of manufacturing includes the steps of vapor-depositing aluminium on one side of the web film containing linear low density polyethylene obtained by the polymerization using metallocene catalyst, winding up the aluminium vapor deposition film temporarily in a reel form, making direct contact between the aluminium vapor deposition surface and the film surface containing a linear low density polyethylene, keeping the reel in predetermined time, unwinding the aluminium vapor deposition film from the kept reel, applying a fused lamination resin by the extrusion lamination by fused polyethylene, between the vapor deposition surface of the aluminium vapor deposition film layer and the surface of the barrier layer, laminating the aluminium vapor deposition film layer and the carrier layer, forming an ink layer in the appearance surface of the outside of the laminate by printing.

2 Claims, No Drawings

METHOD FOR PREPARING LAMINATE FOR PACKAGING MATERIAL AND LAMINATE FOR PACKAGING MATERIAL

DESCRIPTION

Method of manufacturing laminate for packaging material and laminate for packaging material.

1. Technical Field

This invention relates to a method of manufacturing of a laminate for packaging material, and its laminate. In detail, this invention relates to the method of manufacturing the laminate for packaging material which has an excellent barrier suitable for packaging of liquid food etc. at high speed, and its laminate.

2. Background Art

Conventionally, the laminate obtained from the laminating to the core paper of material, such as plastics, such as polyethylene (for example, low density polyethylene by the high-pressure method (LDPE) etc.), polypropylene, polyester, and polyvinyl chloride, metal foil, and a metal vapor deposited film, is used for the packaging material of liquid food. Such material is used in order to reveal the character of material each, to reinforce from the weak point of paper and to give a new function to packaging material.

Aluminum foil is widely used for the metal foil which is one of the material. The metallic foil gives water-resistant, damp-proofing, a gas barrier, a light barrier, etc. to the packaging material, and when using for the outside of packaging material, it has the advantage of making appearance of packaging into a metal tone and giving a high-class feeling.

The metal vapor deposited film is used as alternative of metal foil. The metal vapor deposited film used for the material of packaging material is manufactured mainly by the vacuum vapor deposit of aluminum. Since the vacuum deposition process usually evaporates metal at about 1300-degree C. of high temperature, a heat-resisting property and dimensional stability are required of the film used. Therefore, it is necessary to use the films generally improved by heat-resistant improvement processing of stretching of raw material plastics with high melting point or high glass transition temperature.

From the above-mentioned reason, the aluminium vacuum deposition film is used for the mono-axis or bi-axis oriented (stretched) film of a high density polyethylene, polypropylene, and a polyethylene terephthalate, in fact. However, from the cross-linking by stretching, since the film surface is high-crystallized, an adhesive property drops. Therefore, it is necessary to use the vapor deposited film which has a straight chain-like low density polyethylene film with affinity with a stretching film etc. for a vapor deposited film.

A stretching film is easily shrunk with the heat of a next laminating step. Especially mono-axis stretching high-density polyethylene has the defect that the tear strength of length or a transverse direction is very weak, from the properties. From the above-mentioned reason therefore, the desirable film for vapor deposition is a film manufactured by the inflation method and the cast method, which do not include the stretching. The polyethylene film manufactured especially by the cast method has about the same uniform film thickness as a stretching film, is excellent in surface flat and smooth nature, and is a suitable film.

On the other hand in high-density polyethylene, polypropylene, a polyethylene terephthalate, etc., a melting point is 130 degrees C. or more, and the dissolution/cooling energy is large. When laminating the film of the plastic by the heat-sealing method etc. with other members, a high temperature and large energy are needed and disadvantageous. When laminating a member (for example, low density polyethylene) with a melting point lower than 130 degrees C. by the heat-sealing method especially, the bad influence is remarkable. From a viewpoint of this melting/cooling energy, the desirable raw material plastic of a vapor deposition film is a low melting-point plastic like the polyethylene of low density.

However, as mentioned above, since heat resistance and size stability are demanded of the raw material plastic for vapor deposition films, plastics, such as polyethylene of low density by the high-pressure method, are not suitable.

Generally the laminate for packaging is manufactured by winding off paper or a paper substitution material layer from a raw-paper roll, sending out to a printing machine by the case, printing to the raw-paper surface, and winding the printed paper in a roll shape again, sending to an extrusion laminator, extruding fused polyolefin (for example, LDPE etc.) from an extrusion machine to the raw-paper surface, and laminate-coating between gas barrier layers, when laminating the gas barrier layers (aluminum foil etc.) other than a raw paper. Furthermore, when laminating a gas barrier layer or adding other functional layers, not all layers are laminated at once, partial laminates (pre-laminates) are prepared separately, respectively, for example, these partial laminates are further laminated by the in-line, and a final laminate is obtained.

However, LDPE used there is low density polyethylene obtained by the high-pressure method. The low molecular weight component contained in high-pressure method low density polyethylene shifts to the opposite surface to be laminated in the condition of being temporally made a roll shape. The shifted components in opposite surface may hinders the good adhesive property of heat-seal. And the flavor/taste of the product will deteriorate, when this low-molecular-weight component bleeds for the liquid product in the paper container after filling and preserves at a long period of time.

At the time of manufacture of the laminate for packaging, coating of anchor-coat material, the corona treatment to a laminating surface or/and, the lamination by adhesives resins, such as comparatively expensive EMMAA, etc. are pretreated to the material surface with poor adhesive, if needed. For example, when anchor-coat material is pretreated and laminated, the line speed of a manufacture line is 200–250 m/min.

The laminating surface which is not pretreated by the above and which has poor adhesive property may cause peeling of packaging container wall.

This invention was made based on the above-mentioned background. The purpose of this invention is offering new manufacturing method of the laminate for packaging material which can use the metal vapor deposition film containing the plastic which has heat resistance at the time of the metal vapor depositing process, and is excellent in adhesive ability with other members of a laminate, can totally or partly omit the pretreatments in the manufacture (laminating) process of packaging material, and can be manufactured at high speed.

Another purpose of this invention is offering the laminate for packaging material which can keep up the laminating intensity between layers of a packaging laminate strongly, has an optical shading performance, is excellent in a gas barrier, has a low-temperature sealability, has the metallic tone excellent in packaging appearance when the outside of packaging material laminates the aluminum vapor deposition film, and can show a good printing design.

DETAILED DESCRIPTION OF THE INVENTION

The above-mentioned subject is solved by the manufacturing method of the laminate for packaging material and the laminate for packaging material according to this invention.

The manufacture method of the material laminate for packaging is characterized by manufacturing the web shape packaging laminate which comprises of, at least, a printing ink outer layer, a aluminum vapor deposition film layer containing the linear low density polyethylene obtained from a polymerization using metallocene catalyst, polyethylene/extrusion lamination layer, and a carrier layer of paper or paper substitution material at the following steps:

a step of vapor-depositing aluminum on one side of the web shape film containing the linear low density polyethylene obtained by the polymerization using the metallocene catalyst, a step of winding up temporarily the resultant aluminium vapor deposition film containing the linear low density polyethylene by the polymerization using the metallocene catalyst in a reel form, a step of keeping the reel for predetermined time to directly contact the aluminium vapor deposition surface and the film surface containing linear low density polyethylene, a step of unwinding an aluminium vapor deposition film from the kept reel, a step of by the extrusion lamination of fused polyethylene, applying the lamination resin between the vapor deposition surface of the aluminium vapor deposition film layer and the surfaces of a carrier layer, to laminate the aluminium vapor deposition film layer and a carrier layer and, a step of, simultaneously with the above-mentioned steps or before or after the above-mentioned steps, forming an ink layer in the appearance surface of the outside of the laminate by printing.

In another preferable embodiment of this invention, the carrier layer is laminated without coating anchor coat material in the carrier layer just before the step of laminating the aluminium vapor deposition film layer and the carrier layer.

This material laminate for packaging comprises a printing ink layer, the 1st aluminium vapor deposition polyethylene layer obtained by aluminium vapor deposition to the linear low density polyethylene manufactured from the polymerization using the metallocene catalyst, a carrier layer of paper or paper substitution material, and the 2nd aluminium vapor deposition polyethylene layer obtained by aluminium vapor deposition to the linear low density polyethylene obtained from polymerization using the metallocene catalyst, is constituted in order of the laminating, characterized by that the printing ink layer is laminated to the polyethylene layer side of the 1st aluminium vapor deposition polyethylene layer, the carrier layer of paper or paper substitution material is laminated to the aluminium vapor deposition layer side of the 1st aluminium vapor deposition polyethylene layer through a polyethylene-extrusion lamination layer, the carrier layer of paper or paper substitution material is laminated to the aluminium vapor deposition layer side of the 2nd aluminium vapor deposition polyethylene layer through a polyethylene-extrusion lamination layer.

The packaging material laminate of another embodiment of this invention comprises a printing ink layer, the aluminium vapor deposition polyethylene layer which vapor depositted the aluminium in the linear low density polyethylene obtained by the polymerization using the metallocene catalyst, the carrier layer of paper or paper substitution material, and a polyolefine inner layer, is constituted in order of the above-mentioned lamination, characterized by that the printing ink layer is laminated to the polyethylene layer side of an aluminium vapor deposition polyethylene layer, and the carrier layer of paper or paper substitution material is laminated to the aluminium vapor deposition layer side of an aluminium vapor deposition polyethylene layer through a polyethylene-extrusion lamination layer.

The packaging material laminate of another embodiment of this invention comprises a printing ink layer, a polyolefin outer layer, a carrier layer of paper or paper substitution material, the aluminium vapor deposition polyethylene layer obtained by aluminium vapor deposition to the linear low density polyethylene obtained by a polymerization using the metallocene catalyst, is constituted in order of the above-mentioned lamination, characterized by that the carrier layer of paper or paper substitution material is laminated to the aluminium vapor deposition layer side of an aluminium vapor deposition polyethylene layer through a polyethylene-extrusion lamination layer.

In the preferable embodiment of this invention, anchor coat material is not covered onto the carrier layer surface in the lamination structure of an aluminium vapor deposition film layer and a carrier layer.

In the preferable embodiment of this invention, a printing ink layer is provided in the polyethylene layer surface of an aluminium vapor deposition polyethylene layer, or the carrier layer surface of paper or paper substitution material. Formation of a printing ink layer is made by printing on a polyethylene layer by the usual method using usual ink. For example, after obtaining a pre-laminate by junction of the carrier layer of paper or paper substitution material, an aluminium vapor deposition polyethylene layer, etc., it is preferable to form a printing ink layer on an aluminium vapor deposition polyethylene layer etc.

The linear low density polyethylene (hereinafter mLLDPE) manufactured by using the metallocene catalyst of the raw material plastics which form an aluminium vapor deposition polyethylene layer has a density of below 0.941 g/cm$^3$. Preferable density is 0.925 g/cm$^3$–0.941 g/cm$^3$. If a density becomes more than 0.941 g/cm$^3$, it will become high-density polyethylene (linear polyethylene), and the above-mentioned various bad influence by using high-density polyethylene will be shown. Moreover, when a density become less than 0.925 g/cm$^3$, the melting point becomes less than 115 degrees C., and is not preferable.

Usually, mLLDPE has the molecular weight distribution (a weight average molecular weight/number average molecular weight) of 2–4, and shows the melt index of 0.1–100 g/10 minutes (MI: 190 degree C., 2.16 kg of loads). MI of 0.1–10 g/10 minutes is especially preferable. Desirable mLLDPE is manufactured under existence of a metallocene catalyst by carrying out copolymerization of ethylene and the alpha olefin of C4–C8 as a comonomer (preferably alpha olefins (a carbon number being six or more), such as 1-hexene, 4-methyl-1-pentene, 1-heptene, and 1-octene).

The above-mentioned metallocene catalyst is the combination of the metallocene which is the compound with the structure sandwiched transition metals, such as titanium, zirconium, and hafnium, by the unsaturated cyclic compound containing a cyclopentadienyl radical or a substituted cyclopentadienyl radical of a pi-electron system etc., and co-catalysts, such as aluminium compounds, such as alkyl alminoxane, alkyl aluminium, aluminium halide, and alkyl aluminium halide.

An aluminium vapor deposition polyethylene layer is obtained by the vacuum deposition of the aluminium metal to a film with a preferable thickness of less than 30 micrometers containing the mLLDPE. The film with a thickness of less than 30 micrometers may be a monolayer which comprises only of one mLLDPE film, and may be the multilayer with the mLLDPE film. The film may be multilayer laminates, such as a mLLDPE film and a high-density-polyethylene film. The method of carrying out the vacuum deposition of the aluminium metal to the above-mentioned less than 30 micrometers film includes the batch-cycle method and the continuous system method. Before carrying out the vacuum deposition of the aluminium metal, anchor-coat processing of the heat resistant resin to this film is allowable. The metal layer thickness of vacuum deposition is about hundreds of angstrom.

The steps in the manufacture method of this invention include the step which winds up temporarily the aluminium vapor deposition film containing the linear low density polyethylene obtained by the polymerization using a metallocene catalyst in a reel form, the step which contacts directly the film surface containing the linear low density polyethylene onto the aluminium vapor deposition surface, and the step which keeps the reel at predetermined time.

As a result of an aluminium vapor deposition film's being wound up by the reel form, a storage space can narrow and processing and work of a back step become efficient. There is a bad influence that the pollutants (for example, a low-molecular-weight component, a remains catalyst, etc.) of the surface of another side move by direct contact on the aluminium vapor deposition surface and the another side surface. However, in this invention, since the linear low density polyethylene obtained by the polymerization using the metallocene catalyst does not substantially include a low-molecular-weight component, a remains catalyst, etc., surface contamination by the pollutant between the surface of this another side and the aluminium vapor deposition surface is prevented, and degradation/contamination of the aluminium vapor deposition surface are prevented.

In a preferable embodiment, a reel form aluminium vapor deposition film can be kept in the ordinary temperature of 15 degrees C.-40 degrees C. in at least 48–72 hours. In this invention, storage is also possible to ordinary temperature, a lower temperature or a higher temperature, and a long period of time. In this invention, the step conditions of a manufacturing process can be changed broadly.

The paper which forms the carrier layer of paper or paper substitution material has usual weight of 50–350 g/m². Paper substitution material includes the carrier which consists of polypropylene filled with the inorganic filler.

The step which obtains the packaging material laminate from the carrier layer of paper or paper substitution material and an aluminium vapor deposition polyethylene layer includes the step which laminates an aluminium vapor deposition film layer and a carrier layer by application of the fused laminations resin by the extrusion lamination by fused polyethylene. As for junction in the carrier layer of paper or paper substitution material, and an aluminium vapor deposition polyethylene layer, the carrier layer of paper or paper substitution material needs to be located in the aluminium vapor deposition layer side of an aluminium vapor deposition polyethylene layer.

In the laminate of this invention, an aluminium vapor deposition polyethylene layer gives a barrier performance to packaging material, and when an aluminium vapor deposition polyethylene layer is used for the outside of a packaging material laminate, an aluminium vapor deposition polyethylene layer acts so that the high-class feeling of a metallic tone may be given to the packaging appearance.

In the laminate of this invention, the polyolefin layer can provide in the external surface of a printing ink layer. A printing ink layer is protected by providing the polyolefin layer. As a polyolefin of the polyolefin layer, polyethylene, polypropylene, an ethylene propylene rubber, and polybutene 1 grade are included, and especially polyethylene are preferable. Any of high density polyethylene, medium density polyethylene, low density polyethylene, and linear low density polyethylene are sufficient as the polyethylene to be used. A polyolefin layer thickness is usually 5–200 micrometers. The printing ink layer of a laminate may be provided on the polyethylene layer of an aluminium vapor deposition polyethylene layer, and may be provided in the inside of a polyolefine layer, i.e., the surface in contact with an aluminium vapor deposition polyethylene layer.

The laminate for packaging material of this above-mentioned invention includes an aluminium vapor deposition polyethylene layer as constituent material. The above-mentioned linear low density polyethylene which is the substrate of this aluminium vapor deposition polyethylene layer is excellent in a heat-resisting property, especially the heat-resisting property at the time of the vapor deposition step. The linear low density polyethylene has good affinity with some resins and films, such as linear low density polyethylene, high density polyethylene, polypropylene, and polyethylene terephthalate, paper, and the existing low density polyethylene. The linear low density polyethylene is excellent in a seal properties, shows about the same high gloss as a biaxial-stretching polypropylene film polyethylene-terephthalate film, has good printing appearance, has the off-flavor aptitude over an odor etc. superior to the low density polyethylene, excels the conventional low density polyethylene etc. in an environmental stress cracking-proof (ESCR), excels in various hardness, such as an impact strength and, excels in the workability at the time of processing a straw hole etc. as a paper carton.

The manufacture cost of the laminate can be reduced rather than the case where a laminate with an aluminum foil is manufactured according to the manufacturing method with an aluminium vapor deposition layer of this invention. From the laminate for packaging material of this invention with the above-mentioned predominance, the packaging container of conventionally well-known forms, such as parallel 8-sided rectangular parallelepipeds, such as a brick type, gable-top type form, a cube, a cylinder form, a tetrahedron and a prism, form with the parallel 8-sided prism in the body and four square shape in the top and the bottom, and pouch form, etc. can be formed.

Compared with the conventional container obtained from the laminate which covered the aluminum foil to the pre-laminate of paper and plastics, (1) the container of the packaging material laminate by this invention gives the high-class feeling of a metallic tone, and excel in printing appearance. (2) Since a light transmission is reduced by the vapor deposition layer, decomposition of cow's milk components, such as vitamin D, is controlled. (3) When there are two layers of vapor deposition layers, it has the same high gas barrier as a container with an aluminum foil. (4) The properties of a good sealable linear low density polyethylene is employed efficiently, and problems, such as a poor seal at the time of paper-carton forming/food filling, can be solved. (5) Since an aluminum foil is not included, compared with the lamination of an aluminum foil, manufacture cost is dominance. (6) The above-mentioned vapor deposition layer thickness is very thin like some angstrom unit, and can reduce environmental load extremely. (7) The optional corona treatments of an aluminium surface at the time of printing of an aluminum foil and use of anchor-coat material are also omissible.

EXAMPLE

Hereafter, examples describe this invention in detail.

Example 1

The three-layer structure non-oriented film with a thickness of 25 micrometers which consists of mLLDPE core layers (9 micrometers) with a density of 0.935 g/cm$^3$, and MI of 4 g/10 min and mLLDPE both-sides outside layers (8 micrometers) with a density of 0.940 g/cm$^3$, and MI of 4 g/10 min was prepared by the cast method. On one side of the non-oriented film, with continuation vacuum deposition equipment, the aluminium metal film with thickness of 400 angstrom (40 nm) was formed, and the aluminium vapor deposition polyethylene film was manufactured. The resultant aluminium vapor deposition polyethylene film was wound up to the reel form, and was kept in predetermined time (for one day, seven days and, 30 days) in ordinary temperature. The aluminium vapor deposition polyethylene (mLLDPE) film was unwound from the kept reel. Between the vapor deposition surface of the aluminium vapor deposition film layer, and the surface of a paper (weight 200 g/m$^2$) layer, the fused lamination resin was applied by the extrusion lamination by fused polyethylene. By the application, the aluminium vapor deposition film layer and the carrier layer were laminated. The low density polyethylene (LDPE) was laminated to the inner surface of the carrier layer (paper layer). Subsequently, the packaging material laminate of the following structure was manufactured by ink printing to the polyethylene layer of an aluminium vapor deposition polyethylene film.

Printing ink outermost layer/aluminium vapor deposition polyethylene (mLLDPE) film layer/polyethylene lamination layer/paper layer/LDPE

Example 2

The packaging material laminate of the following structure which has the barrier layer of aluminum foil was manufactured like the example 1.

LDPE outermost layer/printing ink layer/aluminum vapor deposition polyethylene (mLLDPE) film layer/polyethylene lamination layer/paper layer/polyethylene lamination layer/aluminum foil barrier layer/LDPE

Example 3

The packaging material laminate of the following structure which has a two-layer aluminum vapor deposition polyethylene (mLLDPE) film layer on the inside and the outside was manufactured like the example 1.

LDPE outermost layer/printing ink layer/aluminum vapor deposition polyethylene (mLLDPE) film layer/polyethylene lamination layer /paper layer/polyethylene lamination layer/ aluminum vapor deposition polyethylene (mLLDPE) film layer

Example 4

The packaging material laminate of the following structure which has an aluminum vapor deposition polyethylene (mLLDPE) film layer inside was manufactured like the example 1.

LDPE outermost layer/printing ink layer /paper layer/ polyethylene lamination layer/aluminum vapor deposition polyethylene (mLLDPE) film innermost layer

Example 5

The packaging material laminate of the following structure which has the paper substitution material carrier layer excellent in water-resistant like an example 1 was manufactured.

LDPE outermost layer/printing ink layer/inorganic filler containing polypropylene carrier layer/polyethylene lamination layer/aluminum vapor deposition polyethylene (mLLDPE) film innermost layer

Example 6

The packaging material laminate of the following structure was manufactured like the example 1.

LDPE outermost layer/printing ink layer/aluminum vapor deposition polyethylene (mLLDPE) film layer/polyethylene lamination layer/paper layer/LDPE

Example 7

The packaging material laminate of the following structure which has the barrier layer of a silicon oxide (SiOx) vapor deposition film was manufactured like the example 1.

LDPE outermost layer/printing ink layer/aluminum vapor deposition polyethylene (mLLDPE) film layer/polyethylene lamination layer/paper layer/polyethylene lamination layer/ SiOx barrier layer/LDPE

Example 8

The packaging material laminate of the following structure which has the barrier layer of a nylon resin (nylon MXD6 containing) was manufactured like the example 1.

printing ink layer/aluminum vapor-deposit polyethylene (mLLDPE) film layer/polyethylene lamination layer/paper layer/polyethylene lamination layer/barrier layer LDPE

Example 9

The packaging material laminate of the following structure which has an aluminum vapor deposition polyethylene (mLLDPE) film layer in the laminate inside was manufactured like the example 1.

Printing ink layer/paper layer/polyethylene lamination layer/aluminum vapor deposition polyethylene (mLLDPE) film innermost layer Since the examples did not need anchor-coat pretreatment, the line speed of the manufacture line in above-mentioned examples did not become the rate-determining step of the manufacture line speed, but this pretreatment is 400–800 m/min, and improved at high speed.

Thus, though it was high-speed, the packaging container obtained from the laminate for low-temperature seal packaging material has the strong strength between layers, and an optical shading performance, was excellent in the gas barrier, and when the lamination of the aluminium vapor deposition film was carried out to the outside of packaging material, it showed the beautiful metallic tone to packaging appearance.

As the actual proof from the above-mentioned example shows, the manufacturing method of the laminate for packaging material of this invention has a heat-resisting property at the time of a metal vapor deposition step. The metal vapor deposition film containing the plastics which are excellent in a junction performance with other members of a laminate can be used. In the manufacture (lamination) process of packaging material, since pretreatments totally or partially are omissible, packaging material can be manufactured at high speed.

The laminate for packaging material of this invention keeps up the strength between layers of a packaging laminate strongly, has an optical shading performance, is excellent in a gas barrier, has a low-temperature seal performance, and when the lamination of the aluminium vapor deposition film is carried out to the outside of packaging material, it shows the printing design of the outstanding metallic tone to packaging appearance, excellently.

Industrial Applicability

The laminate for packaging material is applied to the packaging container filled with liquid food, such as cow's milk and a soft drink, and is used for manufacture of a drink product etc.

What is claimed is:

1. A method of manufacturing a packaging material laminate of web form comprising at least a printing ink outer layer, an aluminum vapor deposition film layer containing linear low density polyethylene obtained by a polymerization using metallocene catalyst, a polyethylene-extrusion lamination layer, and a carrier layer of paper or paper substitution material, according to following steps:

a step of vapor-depositing aluminum on one side of the web form film containing the linear low density polyethylene obtained by the polymerization using the metallocene catalyst, a step of winding up temporarily the aluminium vapor deposition film containing the linear low density polyethylene obtained by the polymerization using the metallocene catalyst in a reel form, making direct contact between the aluminium vapor deposition surface and the film surface containing the linear low density polyethylene, and keeping the reel for a predetermined time, a step of unwinding the aluminium vapor deposition film from the kept reel, applying a fused lamination resin by extrusion lamination by fused polyethylene between the vapor deposition surface of an aluminium vapor deposition film layer and the surface of the carrier layer, and laminating the aluminium vapor deposition film layer and the carrier layer and, a step of forming an ink layer on the external surface of the outside of the laminate by printing, wherein said printing step is perform simultaneously, before or after the above-mentioned steps.

2. The method of manufacturing the packaging material laminate according to claim 1 wherein the carrier layer is laminated, without coating anchor-coat material on the carrier layer just before the step of laminating the aluminium vapor deposition film layer and the carrier layer.

* * * * *